June 16, 1953   W. T. GRAHAM   2,641,886
WINGED WHEELED HARROW
Filed Oct. 18, 1947   3 Sheets-Sheet 1
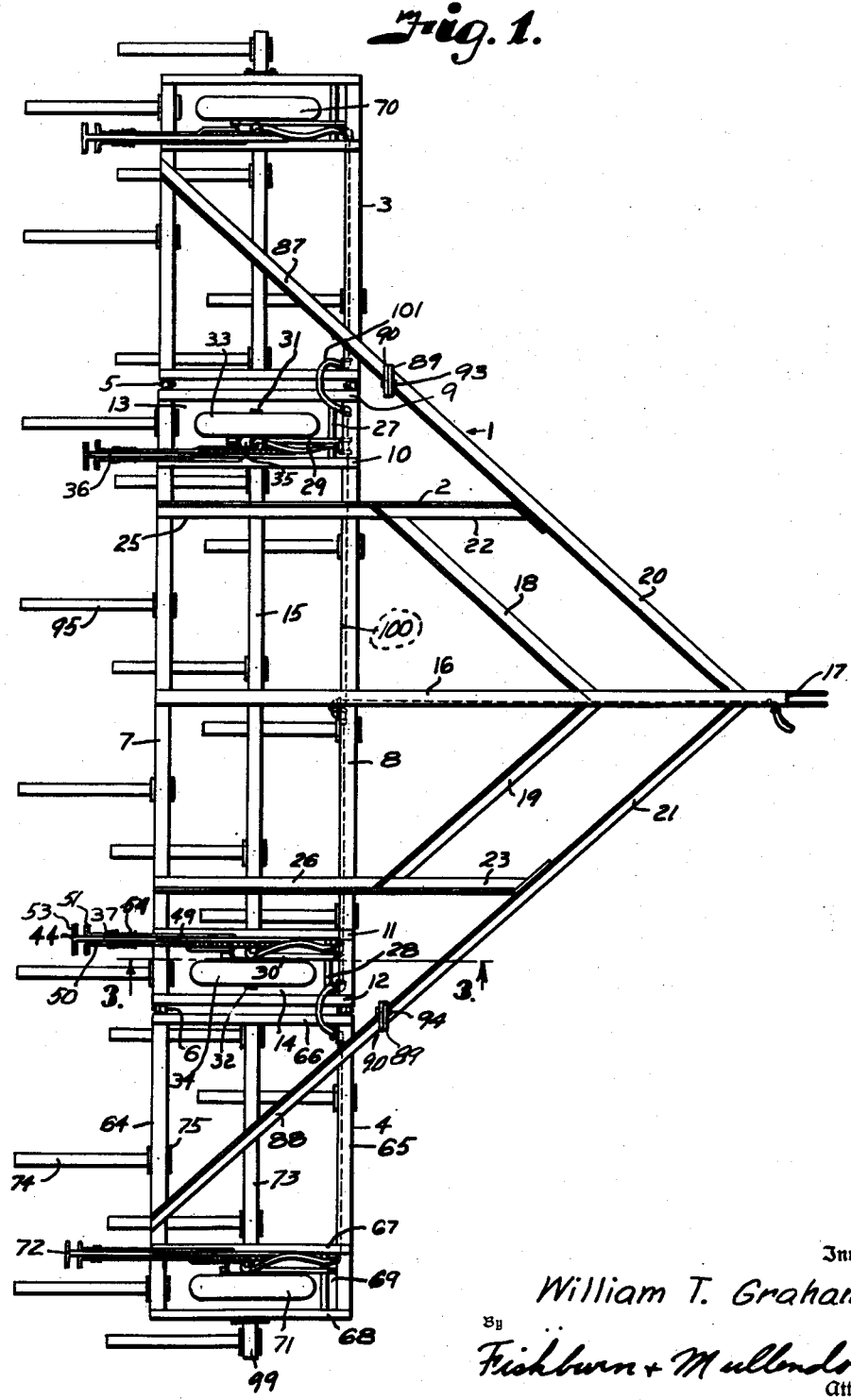
Inventor
William T. Graham
By
Fishburn + Mullendore
Attorneys June 16, 1953  W. T. GRAHAM  2,641,886
WINGED WHEELED HARROW
Filed Oct. 18, 1947 3 Sheets-Sheet 2
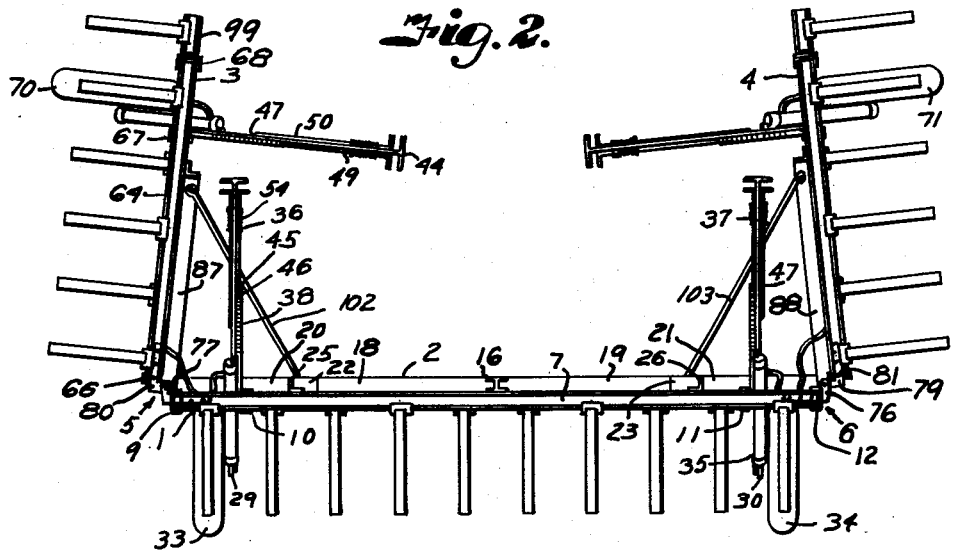
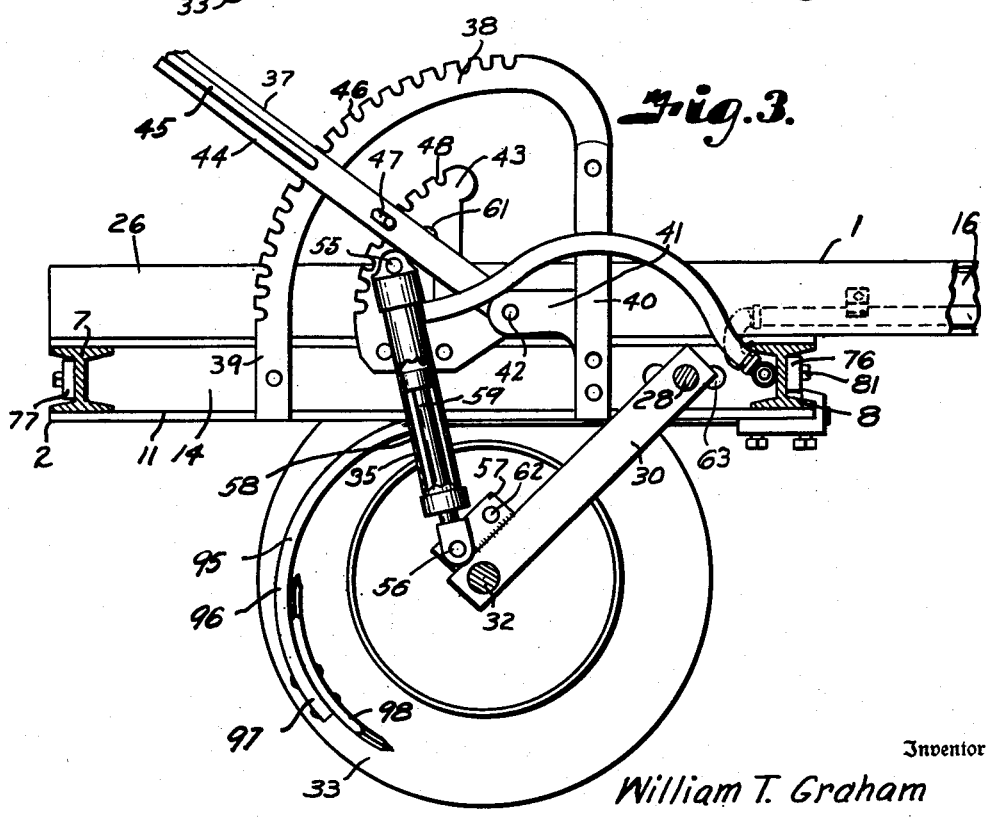
Inventor
William T. Graham
By
Fishburn + Mullendore
Attorneys June 16, 1953 W. T. GRAHAM 2,641,886
WINGED WHEELED HARROW
Filed Oct. 18, 1947 3 Sheets-Sheet 3
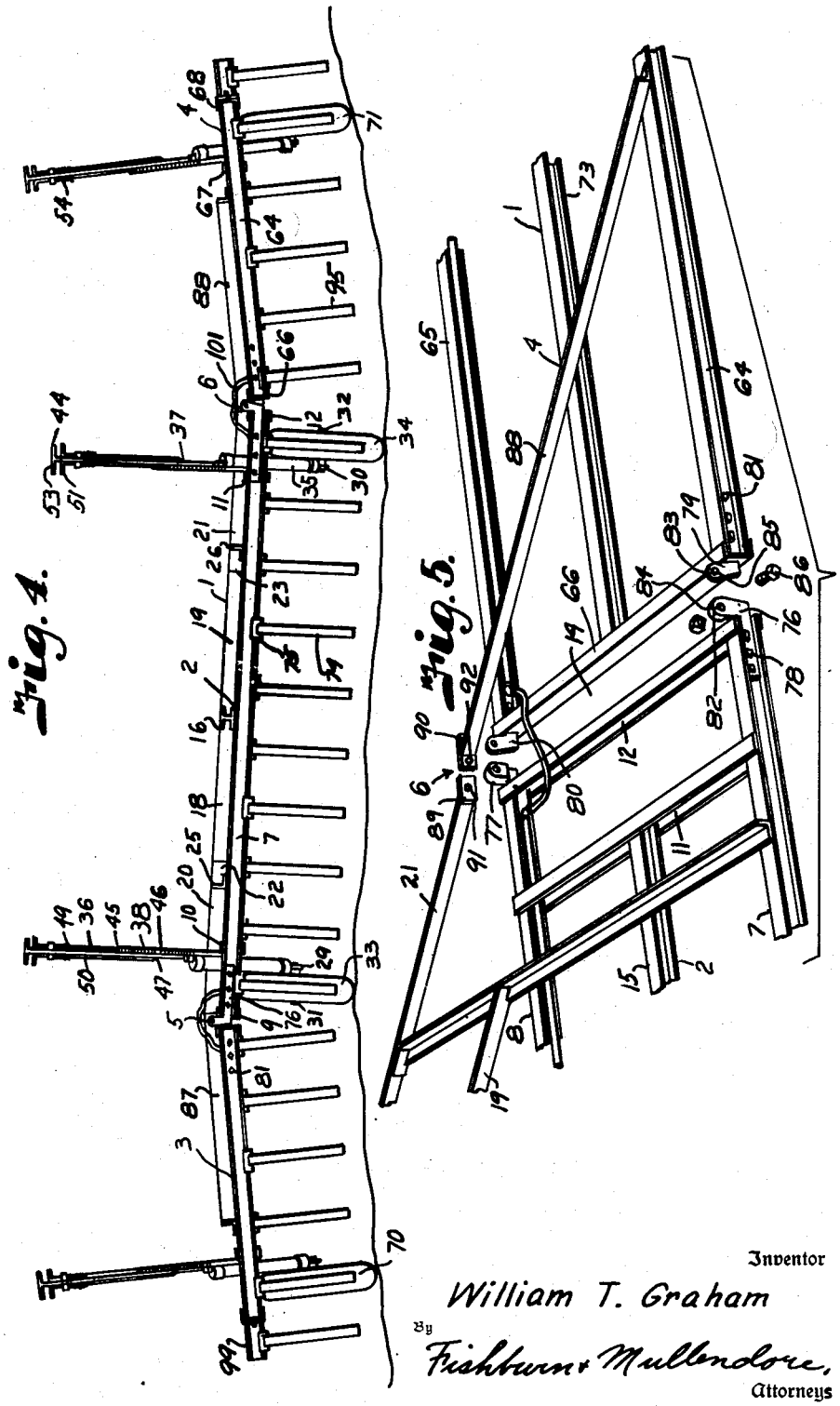
Inventor
William T. Graham
By Fishburn & Mullendore,
Attorneys Patented June 16, 1953

2,641,886

UNITED STATES PATENT OFFICE 2,641,886

WINGED WHEELED HARROW

William T. Graham, Amarillo, Tex.

Application October 18, 1947, Serial No. 780,623

4 Claims. (Cl. 55—93)

This invention relates to plows of the type including a plurality of laterally spaced chisels that work under the surface of the ground to heave and break the soil and form alternate ridges and furrows having exposed surfaces composed of straw and other natural mulch material normally occurring on fields.

Such plows are desirable in dry areas since they prepare the ground for optimum moisture and soil conservation. Farming in such areas and especially the wheat growing section of the United States is usually carried on on a large scale and for economy and ability to put in large crops in a limited space of time, it is essential that the plows cover a wide area. Heretofore plows of the chisel type have been restricted in width because the frames thereof must be wheel supported to permit free and satisfactory operation of the chisels since the chisels must vibrate or produce a pumping action for properly preparing the furrows of uniform depth.

It is, therefore, the principal purpose of the present invention to provide a plow of chisel type having the desired width so that it is adapted to large scale farming, and which permits all the chisels to operate at substantially uniform depth.

Other objects of the invention are to provide a plow with a frame composed of a plurality of hinged sections, with each section supported on wheels which roll upon the surface of the ground and maintain the chisels carried by the respective sections at substantially uniform depth; to provide a plow of inexpensive construction, to provide a plow wherein the outer sections may be raised to permit travel of the plow through narrow passageways such as gates, and to provide a structure whereby the sections may be readily disconnected for separate use of the central section or for transportation of the plow between sites of operation.

It is also an object of the present invention to provide the sections with individual raising and lowering means which may be manually or hydraulically operated to control the depth of the ground working tools.

In accomplishing these and other objects of the invention hereinafter pointed out, I have provided improved structure, the preferred form of which is illustrated in the accompanying drawing wherein:

Fig. 1 is a plan view of a plow constructed in accordance with the present invention and showing the respective sections in plowing position.

Fig. 2 is a rear elevational view of the plow showing the outer or end sections pivoted upwardly and secured by stay rods to facilitate movement of the plow from one field to another.

Fig. 3 is a cross section through the plow on the line 3—3 of Fig. 1, particularly illustrating a wheel support and the adjusting mechanism by which the tools may be raised or lowered into the ground to operate at a given depth.

Fig. 4 is a rear elevational view showing flexibility of the plow frame as it is drawn over an uneven ground surface.

Fig. 5 is a fragmentary perspective view of adjacent sections of the plow frame particularly illustrating the hinge connection between the sections.

Referring more in detail to the drawings:

1 designates a plow constructed in accordance with the present invention and which includes a flexible frame composed of a central section 2 and end sections 3 and 4 that are hinged to the central section by joints 5 and 6 later described. The central section of the frame includes parallel transverse beams 7 and 8 that are interconnected by pairs of spaced longitudinal members 9—10 and 11—12 to provide wheel pockets 13 and 14 therebetween. The central section also includes an intermediate transverse beam 15 that connects the innermost longitudinal members 10 and 11. Extending forwardly across the mid portion of the beams and suitably connected thereto is a main draft tongue 16 having its forward end 17 arranged for connection to the draftbar of a tractor (not shown). The main draft tongue 16 is suitably braced relative to the central section by laterally and rearwardly disposed draft bars 18—19 and 20—21 having connection with forwardly projecting ends 22 and 23 of secondary tongue members 25 and 26 which are secured to the transverse beams 7, 8 and 15, in laterally spaced parallel relation with the main draft tongue 16. Mounted at the forward ends of the wheel pockets 13 and 14 and carried between the pairs of longitudinal members 9—10 and 11—12 are shafts 27 and 28 having arms 29 and 30 that are adapted to extend rearwardly and downwardly and the lower ends have laterally disposed spindles 31 and 32 for carrying ground wheels 33 and 34. The central section of the frame is thus supported at its ends on the wheels 33 and 34 and is adapted to be raised and lowered with respect thereto by connecting the ends of the arms through a linkage 35 with lever mechanism 36 and 37. Each raising and lowering mechanism includes an arcuate rack 38 having depending leg portions 39 and 40 attached to the inner longitudinal members 10 and 11. Extending rearwardly from the leg portions 40 at a point slightly above the upper level of the frame are brackets 41 carrying transverse pivot members 42 located in the axial center of the arcuate racks 38 for pivotally mounting inner rack segments 43 and main actuating levers 44. The main levers 44 have pawls 45 that are mounted on one side of the levers to engage in one of a series of notches 46 formed in the upper edges of the racks 38. The opposite side of the levers also carry a pawl 47 adapted to engage in one of a series of notches 48 formed in the inner rack segments 43, as best shown in Fig. 3. The pawls are connected by suitable rods 49 and 50 that extend upwardly along the sides of the lever and terminate in lateral finger gripping portions 51 that cooperates with T-shaped handles 53 on the ends of the levers. The pawls are normally retained in position by suitable springs 54 as in ordinary levers on farm machinery.

The links 35 are pivotally connected with the inner rack segments 43 by pins 55 and the lower ends are connected by pins 56 with apertured plates 57 attached to the upper edges of the wheel carrying arms as shown in Fig. 3. In the illustrated instance the links include cylinders 58 and piston rods 59 having pistons slidably mounted in the cylinders.

To provide for adjustment of the parts, the racks 43 are preferably provided with a series of openings 61 for the pins 55 and the plates 57 may be provided with series of openings 62 for the pins 56. Likewise the longitudinal members 9—10 and 11—12 may be provided with a series of openings 63 for mounting the ends of the shafts 27 and 28.

The end sections 3 and 4 each comprise transverse beams 64 and 65 that are connected at their inner ends by a longitudinal beam 66 and their outer ends by pairs of spaced longitudinal beams 67 and 68 to form wheel pockets 69 which mount wheels 70 and 71 in exactly the same manner as the wheels previously described, the end sections being adjusted relatively to the wheels by mechanisms 72 identical in construction with the corresponding mechanisms 36 and 37 previously described. The end sections also include an intermediate transverse beam 73 which connects the longitudinal beams 66 with the beams 67.

The transverse members of the respective sections are preferably of H-shaped cross section and arranged with the webs thereof vertical and the flanges in horizontal position to mount the ground working tools 74 by suitable clamps 75 attached to the beams at spaced points along the length thereof. The other members of the frames may comprise channels or similar I-beam sections and the brace members may be of angle cross section as shown in the drawings.

The hinge joints 5 and 6 comprise brackets 76 and 77 attached to the webs of the longitudinal beams of the center section by suitable fastening devices such as bolts 78. The inner ends of the end sections are provided with similar brackets 79 and 80 that are fastened to the webs of the transverse beams 64 and 65 by fastening devices 81. The brackets have interengaging lugs 82 and 83 provided with apertures 84 and 85 for passing pivot members such as bolts 86 to secure the sections in hinging relation whereby the end sections may rise and lower and thereby permit the outermost wheels 70 and 71 to follow the contour of the ground as shown in Fig. 4. In order to brace the end sections and to provide draft connections for the end sections, the draft bars 20 and 21 continue outwardly and rearwardly from the auxiliary draft tongues 22 and 23 to terminate adjacent the hinge joints as shown in Fig. 1. The end sections are provided with similar draft members 87 and 88 which extend diagonally thereacross in registry with the draft members 20 and 21 and which are fixed to the transverse beams of the end sections in any suitable manner. The forward ends of the draft members 87 and 88 terminate adjacent the terminals of the draft members 20 and 21 and the mating ends of the respective draft members are provided with transverse plates 89 and 90 having interengaging faces extending parallel with the transverse beam members as shown in Fig. 5. The plates are provided with apertures 91 and 92 in axial alignment with the axis of the hinge joints 5 and 6 so as to accommodate bolts 93 and 94 on which the draft members 87 and 88 are adapted to pivot in cooperation with the hinge joints. It is thus obvious that end sections have draft connection with the main draft tongue so as to reduce side draft and support the sections in aligning registry with the center section.

The ground working tools comprise resilient beams 95 that curve rearwardly and downwardly as at 96 and terminate in substantially forwardly extending ends 97 which mount chisels 98 to engage in ground and heave and break the soil when the plow is in operation.

The ground working tools may be arranged in any desired relation along the length of their supporting beams; however, a ground working tool is positioned to the rear of each of the wheels as shown in Fig. 1 and the end members 68 are preferably provided with brackets 99 that project outwardly therefrom in registry with the intermediate beam members whereby a ground working tool may be mounted at the outer sides of the wheels 70 and 71 as best shown in Fig. 1.

In using the plow, the tongue 16 is connected with the draftbar of a tractor and the plow is drawn over the field with the frame supported on the respective wheels, the end members of the frame being connected with the center section to rise and fall with variations in the ground level. The ground working tools are caused to penetrate the ground the desired depth by releasing the pawls 45 so that the levers may be rocked on the pivots 42 and effect lowering of the frame with respect to the wheels. The pawls 47 being connected with the teeth of the inner rack segments, permit upward swinging movement of the segments and lowering of the frame causing the chisel points of the tools to enter the ground. If greater adjustment is desired, both pawls may be released and the levers re-adjusted so that the pawls 47 engage a different notch in the rack 43. If the plow is to be hydraulically operated the hydraulic fluid will be delivered through the respective cylinders through suitable ducts 100 that extend along the forward transverse beam members to join with a duct extending along the tongue to a control and source of pressure supply on the tractor (not shown). Suitable flexible connections 101 are provided in the ducts at the hinge joints to permit freedom of movement of the end sections.

From the foregoing it is obvious that I have provided a plow having substantial width and which is constructed to provide maximum flexibility so that the wheels may follow the ground surface and maintain the ground working tools at substantially uniform depth. It is also obvious that I have provided a plow which is particularly adapted to large scale farming and which is of simple construction and operation. It is also obvious that the end sections may be readily disconnected to permit use of the center section if desired or the end sections may be folded on the hinge joints, in which case the end sections may be supported by stay rods 102 and 103 connected with one of the frame members of the center section and with a frame member of the end sections as shown in Fig. 2.

What I claim and desire to secure by Letters Patent is:

1. A plow including a central section composed of laterally spaced transverse beams, spaced longitudinal members connecting ends of the transverse beams and forming wheel pockets at the ends of the central section, end sections composed of transverse beams registering with respective beams of transverse beams of the central section, hinge means connecting said end sections to the ends of the central section, spaced longitudinal members connecting outer ends of the transverse beams of the end sections and forming wheel pockets, a wheel for each pocket, means rotatably mounting the wheels in the respective pockets for supporting said sections, a main tongue extending longitudinally across the midpoint of the transverse beams of the central section and projecting therefrom to provide a draft connection for a tractor, secondary tongues extending across the transverse beams of the central section adjacent the wheel pockets, draft bars fixed to and extending diagonally across the transverse beams of the end sections and having connection with said tongues forwardly of the central section, and hinge joints in said draft bars having pivotal axes registering with the pivotal axes of the hinge means connecting said sections.

2. A plow including a central section composed of laterally spaced transverse beams, spaced longitudinal members connecting ends of the transverse beams and forming wheel pockets at the ends of the central section, end sections composed of transverse beams registering with respective beams of transverse beams of the central section, hinge means connecting said end sections to the ends of the central section, spaced longitudinal members connecting outer ends of the transverse beams of the end sections and forming wheel pockets, a wheel for each pocket, means rotatably mounting the wheels in the respective pockets for supporting said sections, a main tongue extending longitudinally across the midpoint of the transverse beams of the central section and projecting therefrom to provide a draft connection for a tractor, secondary tongues extending across the transverse beams of the central section adjacent the wheel pockets, draft bars fixed to and extending diagonally across the transverse beams of the end sections and having connection with said tongues forwardly of the central section, hinge joints in said draft bars having pivotal axes registering with the pivotal axes of the hinge means connecting said sections, and secondary draft bars connecting the auxiliary tongues with the main tongue.

3. A plow including a central frame section, section, wheels carrying ends of the central section, end frame sections registering with the ends of the central section, hinge means connecting said end sections to the ends of the central section, a wheel supporting the outer ends of each end section, a main tongue fixed to and extending longitudinally across the midpoint of the central section and projecting forwardly therefrom to provide a draft connection for a tractor, draft bars fixed to and extending diagonally across the end sections and spaced from said hinge means, said draft bars having portions extending forwardly from the end sections and connected with the forward end of the main tongue, and hinge joints in said extending portions of the draft bars having pivotal axes located in registry with the pivotal axes of the hinge means which connect the end sections with the central section.

4. A plow including a central frame section, wheels carrying ends of the central section, end frame sections registering with the ends of the central section, hinge means connecting said end sections to the ends of the central section, a wheel supporting the outer ends of each end section, a main tongue fixed to and extending longitudinally across the midpoint of the central section and projecting forwardly therefrom to provide a draft connection for a tractor, draft bars fixed to and extending diagonally across the end sections and spaced from said hinge means, said draft bars having portions extending forwardly from the end sections and connected with the forward end of the main tongue, hinge joints in said extending portions of the draft bars having pivotal axes located in registry with the pivotal axes of the hinge means which connect the end sections with the central section, and means connecting end portions of the central frame section with the draft bars forwardly of said hinge joints to stiffen the draft bars when the plow is under turning movement.

WILLIAM T. GRAHAM.

References Cited in the file of this patent

UNITED STATES PATENTS

| Number | Name | Date |
|---|---|---|
| 971,591 | Booth | Oct. 4, 1910 |
| 1,008,915 | Howell | Nov. 14, 1911 |
| 1,404,544 | Rettig | Jan. 24, 1922 |
| 1,497,781 | Geisler | June 17, 1924 |
| 1,563,261 | Curtis | Nov. 24, 1925 |
| 1,844,560 | Bozeman | Feb. 9, 1932 |
| 1,938,132 | Bromelsick et al. | Dec. 5, 1933 |
| 2,029,249 | Noell et al. | Jan. 28, 1936 |
| 2,298,161 | Robinson | Oct. 6, 1942 |
| 2,493,811 | Graham | Jan. 10, 1950 |